United States Patent [19]

Farineau

[11] Patent Number: 4,964,599
[45] Date of Patent: Oct. 23, 1990

[54] SYSTEM FOR CONTROLLING ROLL AND YAW OF AN AIRCRAFT

[75] Inventor: Jacques Farineau, Toulouse, France

[73] Assignee: Aerospatiale Societe Nationale Industrielle, Paris, France

[21] Appl. No.: 320,094
[22] PCT Filed: Jun. 20, 1988
[86] PCT No.: PCT/FR88/00329
§ 371 Date: Jan. 9, 1989
§ 102(e) Date: Jan. 9, 1989
[87] PCT Pub. No.: WO88/10458
PCT Pub. Date: Dec. 29, 1988

[30] Foreign Application Priority Data

Jun. 24, 1987 [FR] France ............................... 87 08870

[51] Int. Cl.$^5$ ............................................. B64C 13/22
[52] U.S. Cl. ..................................... 244/195; 244/228; 244/194; 244/196; 244/177; 364/434
[58] Field of Search ................ 244/228, 230, 194, 196, 244/195, 177; 364/434, 433

[56] References Cited

U.S. PATENT DOCUMENTS

| | | | |
|---|---|---|---|
| 2,953,329 | 9/1960 | Ciscel | 244/196 |
| 3,512,737 | 7/1970 | Platt et al. | 244/77 |
| 3,730,461 | 5/1973 | Knemeyer | 244/196 |
| 4,236,685 | 12/1980 | Kissel | 244/196 |
| 4,422,180 | 10/1983 | Wendt | 455/603 |
| 4,527,242 | 7/1985 | McElreath et al. | 364/434 |
| 4,793,576 | 12/1988 | Frerk | 244/228 |

FOREIGN PATENT DOCUMENTS 0046875 11/1982 European Pat. Off. ............ 244/228
1018086 8/1952 France .

OTHER PUBLICATIONS

L. Muller, "Flight Control At Honeywell", Scientific Honeyweller, vol. 7, No. 1, 1986 (Minneapolis, Minnesota, U.S.), pp. 8 to 14.
R. L. Kisslinger et al., "Design and Development of the Control Laws for the F-18 Primary Flight Control System", IEEE 1980, Nationaly Aerospace and Electronics Conference NAECON 1980 held at Dayton Convention Center, May 20-22 May 1980, vol. 1 (U.S.), pp. 158-165.

Primary Examiner—Charles T. Jordan
Assistant Examiner—Michael J. Carone
Attorney, Agent, or Firm—Fisher, Christen & Sabol

[57] ABSTRACT

System for controlling roll and yaw of an aircraft. The system includes a device capable of elaborating, from electric signals respectively representative of the position of a first voluntary actuation member, the rolling speed, the attitude, the yaw speed, the sideslip and of the position of a second voluntary actuation member, a single electrical order for roll control formed by a linear combination of the electric signals. There is a device capable of elaborating, from the same electric signals, an electrical order for yaw control formed by a linear combination of the electric signals. There is also a device which makes it possible to combine the electrical order for yaw control and a mechanical order coming directly from the second voluntary actuation member.

20 Claims, 5 Drawing Sheets

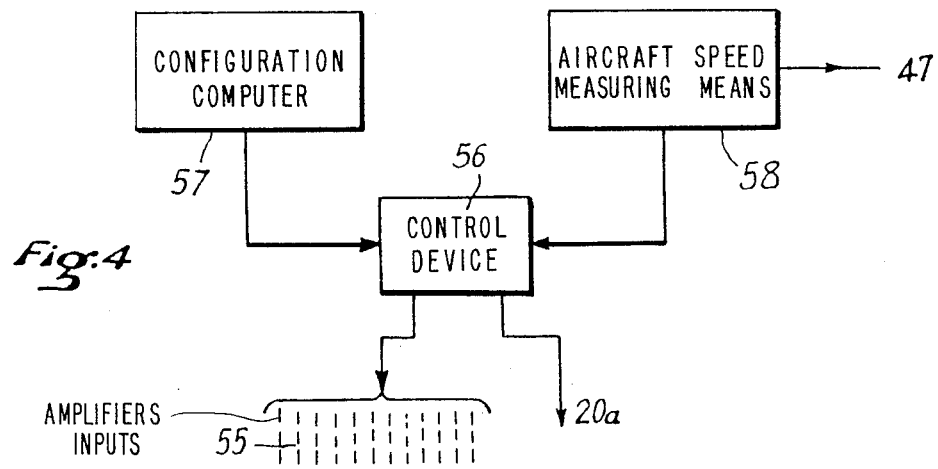
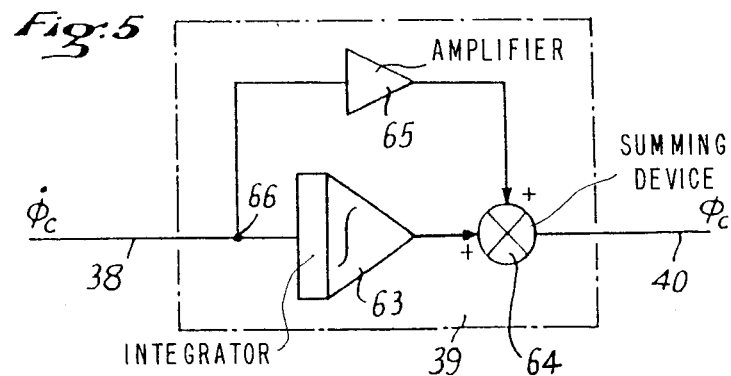
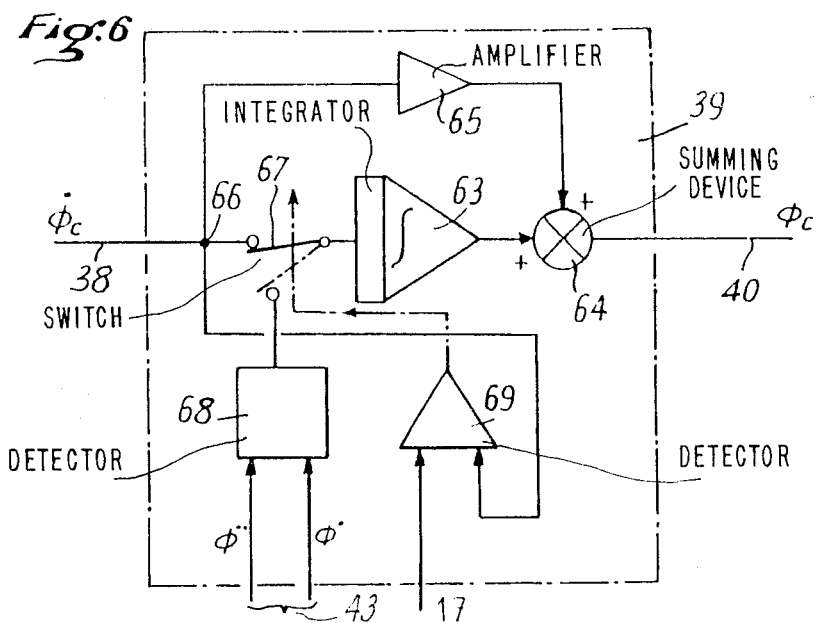

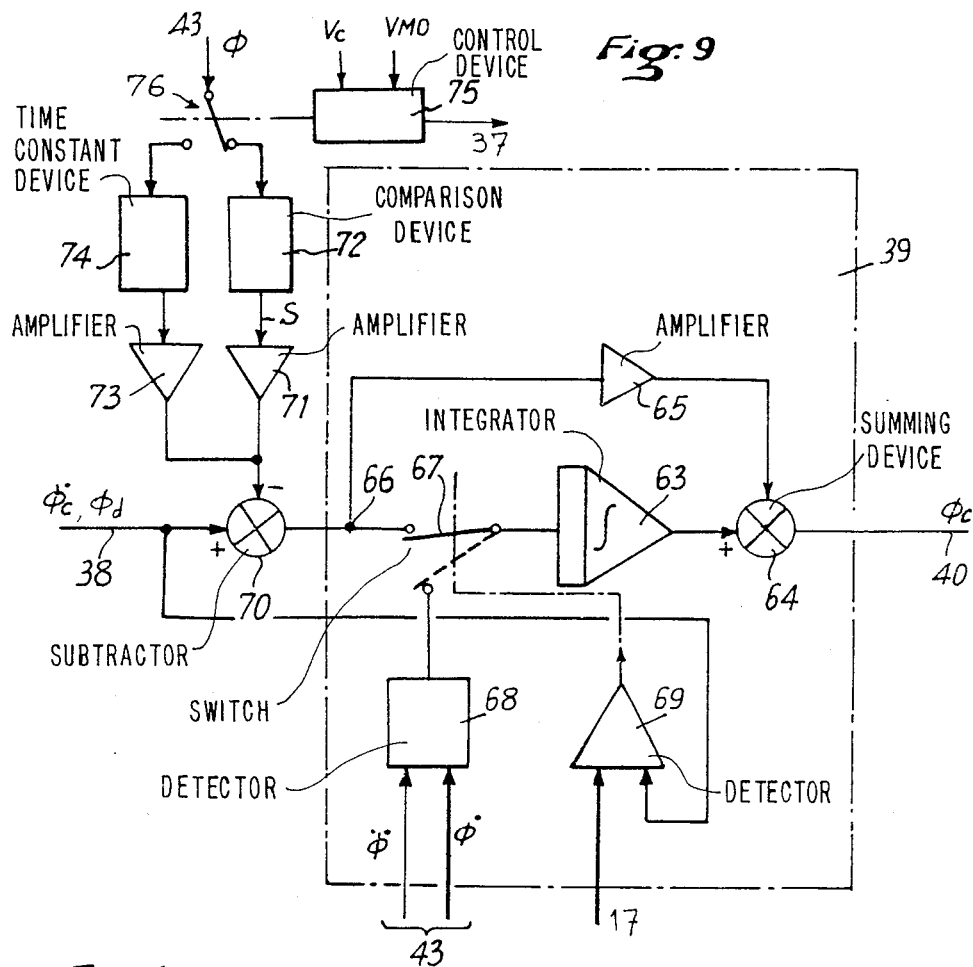

SYSTEM FOR CONTROLLING ROLL AND YAW OF AN AIRCRAFT

The present invention relates to a system for controlling the roll and yaw of an aircraft, employing electrical flight controls.

It is known that the control of roll of an aircraft results from the actuation of the ailerons and possibly of the spoiler flaps, with the aid of a control stick, whilst the control of yaw is obtained by deflection of the rudder with the aid of a rudder pedal.

It is also known that:

(a) a deflection of the roll control surfaces (ailerons and spoiler flaps) not only laterally inclines the aircraft (roll control), but also provokes a sideslip of this aircraft which degrades the performances thereof. In order to avoid such sideslip, it is necessary to act simultaneously in adequate manner on the deflection of the rudder;

(b) a deflection of the rudder not only controls yaw of the aircraft, but, in addition, provokes, on the one hand, a sideslip of said aircraft and, on the other hand, an increase in the roll attitude (roll) thereof. Such an increase in the roll attitude may rapidly turn the aircraft on its back, with the result that, in order to conserve the roll attitude at a reasonable value and to counter the sideslip induced by the deflection of the rudder, it is necessary to deflect the roll control surfaces in appropriate manner;

(c) when an aircraft is inclined laterally, whilst neither its roll control surfaces nor its rudder are deflected, it is not neutral in roll, i.e. it does not conserve a constant roll attitude, but, on the contrary, its roll attitude drifts either towards the inside of the turn (aircraft divergent in roll), or towards the outside of the turn (aircraft convergent in roll);

(d) when lateral disturbances or a dissymetry of propulsion (failure of an engine) occur, the aircraft takes considerable roll attitudes, which must be corrected by actuation of the roll control surfaces and of the rudder.

The foregoing shows, on the one hand, that the roll and yaw controls are closely interdependent and, on the other hand, that, with mechanical flight controls, the pilot must frequently intervene on the roll and yaw controls.

Furthermore, electrical flight controls are known, enabling at best one or more flight computers to be used and presenting, with respect to the mechanical flight controls, considerable gains in mass.

The present invention has for its object a system for controlling the roll and yaw of an aircraft, especially designed for electrical flight controls and intended to considerably lighten the workload of the pilot in this domain.

To that end, according to the invention, the system for controlling roll and yaw of an aircraft comprising roll control surfaces actuated from a first voluntary actuation member (control stick) and a rudder actuated from a second voluntary actuation member (rudder pedal) via a mechanical transmission, said first and second voluntary actuation members being associated with transducers delivering respectively electrical signals depending on the position of said members, said aircraft comprising in addition means capable of delivering electrical signals respectively representative of the rolling speed, the attitude, the yaw speed and the sideslip of said aircraft, is noteworthy in that it comprises: —a device capable of elaborating—from said electrical signals respectively representative of the position of said first voluntary actuation member, the rolling speed, the attitude, the yaw speed, the side-slip and of the position of said second voluntary actuation member—a single electrical order for roll control formed by a linear combination of said electrical signals;

a distribution device which, from said single electrical roll control order, controls each of said roll control surfaces via actuation means;

a device capable of elaborating—from said electrical signals respectively representative of the position of said first voluntary actuation member, the rolling speed, the attitude, the yaw speed, the side-slip and of the position of said second voluntary actuation member—an electrical order for yaw control formed by a linear combination of said electrical signals; and a device for combining said electrical yaw control order and a mechanical order coming directly from said second voluntary actuation member via said mechanical transmission, to deliver a single combined order of yaw control, which controls said rudder, via actuation means.

It is thus seen that, in the system for controlling roll and yaw of an aircraft according to the invention, the yaw control parameters are taken into account for elaborating the single roll control order and that, inversely, the parameters of roll control are integrated in the electrical yaw control order.

Consequently:

when the aircraft is stressed in roll by the actuation of the roll control surfaces, the sideslip which results therefrom may be directly countered by the system of the invention which deflects the rudder in appropriate manner so that the pilot no longer has to intervene to actuate the rudder pedal;

when the aircraft is stressed in yaw by the actuation of the rudder, the induced sideslip and attitude which result therefrom may be directly countered by the system of the invention which deflects the roll control surfaces in appropriate manner, so that the pilot no longer has to intervene to actuate the control stick;

when lateral disturbances or an engine failure occur, the corresponding variations of roll attitude with respect to the order given by the pilot by means of the control stick may bring about the generation, respectively by said device for elaborating a single electrical order for roll control and by said device for elaborating an electrical order for yaw control, of control orders acting on the roll control surfaces and on the rudder for these variations to be as small as possible.

In this way, thanks to the invention, the workload of the pilot is considerably limited since, when the control stick is released, the aircraft always remains in sound flight configurations even when disturbances occur and, for a given manoeuvre, the pilot no longer has to counter the secondary efforts due to this manoeuvre.

It will, moreover, be noted that, in the event of failures occurring in the system, rendering impossible the generation of the electrical orders for yaw control and for roll control, the aircraft would remain pilotable in yaw and in roll, as a last resort, by the actuation of the rudder pedal which, via said mechanical transmission and said device delivering the single combined order for yaw control, would act on the rudder.

In an advantageous embodiment, the device for elaborating the single electrical order for roll control comprises a plurality of amplifiers whose inputs receive respectively said electric signals representative of the position of said first voluntary actuation member, the rolling speed, the attitude, the yaw speed, the sideslip and of the position of said second voluntary actuation member, and whose outputs are connected in common to a summing device delivering said single electrical order for roll control. Similarly, the device for elaborating the electrical order for yaw control advantageously comprises a plurality of amplifiers whose inputs receive respectively said electric signals representative of the position of said first voluntary actuation member, the rolling speed, the attitude, the yaw speed, the sideslip and of the position of said second voluntary actuation member, and whose outputs are connected in common to a summing device delivering said electrical order for yaw control.

Each of said amplifiers of the device for elaborating the single electrical order for roll control and of the device for elaborating the electrical order for yaw control is preferably of the type in which the gain may be chosen from several different values. In this way, as a function of the flight configuration and of the speed of the aircraft, it is possible to give each of said amplifiers the most appropriate gain (of positive sign or of negative sign) and therefore to give to the signal that it amplifies the optimum magnitude in the linear combination of the electric signals. The different types of configurations may correspond respectively, for example, to landing, take-off, flight with clean wings, etc . . . and, for each configuration, several gain values may be provided as a function of the speed of the aircraft. Each configuration results from an order of the pilot and is ensured by a configuration computer. Consequently, the gain of said amplifiers may be controlled by said configuration computer in connection with the means for measuring the speed of the aircraft.

Said device for distributing the single electrical order for roll control may be a table which causes a value of deflection of each of said roll control surfaces to correspond to any value of said single electrical order. In this way, this table has in memory a plurality of possible distributions. As a function of the amplitude of said single electrical order and of the present configuration of the aircraft, the table delivers the optimum distribution that it has in memory. Of course, for a given distribution, the value of deflection of certain of said roll control surfaces may possibly be zero.

Furthermore, said device delivering a single combined order for yaw control may be constituted by an assembly of levers forming a deformable parallelogram of which one articulation is fixed, said electrical order and said mechanical order for yaw control being respectively applied to the two sides of said articulated parallelogram about said fixed articulation, whilst the single combined order for yaw control is taken on one of the other sides of said parallelogram.

The device for elaborating the single electrical order for roll control and the device for elaborating the electrical order for yaw control may receive from the inertial system on board, also called inertial reference system, the signals respectively representative of the rolling speed, the attitude and the yaw speed. On the other hand, on board the aircraft, the sideslip is generally not measured. Thus, according to another particular feature of the present invention, the system for controlling roll and yaw comprises means for generating said electric signal representative of the sideslip from, on the one hand, electric signals of rolling speed and of yaw speed and a lateral acceleration signal, given by said inertial system and, on the other hand, information on deflection of the rudder and the roll control surfaces. The latter information on deflection of the rudder and the roll control surfaces may come from sensors or be respectively constituted by the electric signals delivered by said device for elaborating the electrical order for yaw control and by said device for distributing the single electrical order for roll control.

The system according to the invention preferably comprises a transducer, of known type and conventionally used on modern aircraft, converting the tipping of said first voluntary actuation member into a required rolling speed, as well as an integrator device converting said required rolling speed into a reference value of attitude. Moreover, it is advantageous if said integrator device comprises an integrator and a phase advance amplifier whose inputs have a common point receiving said required rolling speed and whose outputs are connected to a summing device. In this way, the aircraft is neutral in roll. In fact, when the pilot, after having obtained by actuation of said first voluntary actuation member a desired value for the attitude of the aircraft, releases said first voluntary actuation member, the latter, in known manner, returns spontaneously to its neutral position corresponding to a required rolling speed of zero. Consequently, in the absence of outside disturbances, the aircraft conserves the reference attitude which it attained at the moment when the pilot released said first voluntary actuation member.

In order to avoid that, in the case of saturation of the roll control surfaces, the real attitude taken by the aircraft may be delayed with respect to the attitude required by the pilot, it is advantageous if, between said point common to the integrator and to the amplifier, and the input of said integrator, there is disposed a controlled switch capable of connecting the input of said integrator either to said common point or to a generator emitting a signal comprising the speed of variation of the real attitude, said switch being controlled by the saturation of the roll control surfaces, when the control stick order is not zero. In order to introduce a phase advance, said generator preferably emits a signal which is a linear combination of the first derivative and of the second derivative of the roll attitude. Of course, this speed and this acceleration of the variation of the real attitude are given by the inertial system on board.

It may be advantageous if the aircraft, instead of being neutral in roll for any value of attitude as mentioned hereinabove, is stable in roll when the attitude is greater, in absolute value, than a certain threshold, whilst remaining neutral in roll when the absolute value of the attitude is less than said threshold. In this way, when the attitude is greater than said threshold and the pilot releases the control stick, the attitude automatically resumes a value equal to said threshold. Moreover, it is also advantageous if, beyond said threshold, the roll attitude is a function of the position of the control stick: a limitation of the attitude is thus obtained.

To that end, according to an important feature of the present invention, on the one hand, it is provided that, beyond the said threshold, the transducer associated with said first voluntary actuation member delivers a required attitude value and no longer a desired roll speed value, as is the case below said threshold, and, on the other hand, there are arranged between the output of this transducer and the integrator device, first means capable of subtracting from the signal issuing from said transducer a correction signal which is zero beneath said threshold, but which is a function of the attitude value really attained by the aircraft beyond said threshold. In this way, beyond said threshold, the integrator device integrates the difference, variable in time, between the required attitude value delivered by said transducer and the real attitude value of the aircraft and delivers at its output a required attitude reference. Said correction signal is preferably proportional to $\phi - \phi s$, if the attitude $\phi$ is positive and greater than the positive value $+\phi s$ of said threshold, and to $-\phi + \phi s$, if the attitude $\phi$ is negative and less than the negative value $-\phi s$ of said threshold.

Similarly, it is important that the present invention allows protection of the aircraft against wobble at high speed. In an advantageous embodiment of the invention, it is thus provided that, beyond a speed threshold (maximum operational speed) of the aircraft, the transducer associated with said first voluntary actuation member delivers a required attitude value, whilst, below said speed threshold, this transducer delivers a required roll speed and there are disposed, between the output of said transducer and the integrator device, second means capable of subtracting from the signal issuing from the transducer a correction signal which is proportional to the real attitude of the aircraft. In this way, if the speed of the aircraft becomes greater than the speed threshold and if the pilot releases the control stick, the aircraft automatically resumes a zero attitude.

Said first and second subtraction means are preferably mounted in parallel and are rendered alternately active in dependence on means comparing the speed of the aircraft with said speed threshold.

According to another important feature of the present invention, the system for controlling roll and yaw allows automatic correction of the dissymetry of thrust due to the breakdown of an engine, and therefore the control of the path of the aircraft.

It is known that, in order to counter a dissymetry of thrust, one may:

either deflect the rudder alone, which brings about sideslip of the aircraft;

or deflect the rudder and the roll control surfaces, which makes it possible to avoid sideslip.

However, these methods are not equivalent as far as performances are concerned and it has appeared that it was preferable to obtain correction without deflection of the roll control surfaces, i.e. to maintain constant the heading of the aircraft without using these roll control surfaces.

If it is assumed, in order to explain the phenomenon simply, that the roll control surfaces and the rudder of the aircraft present at the moment of occurrence of a breakdown of one of the engines of the aircraft, a zero deflection, all the representative signals addressed to the system are zero at that moment. Consequently, they cannot oppose the aircraft leaving in roll. As soon as this unbalance roll is started, the attitude and roll speed signals will intervene on the roll control surfaces to oppose this roll, and the aircraft will be stabilized at values of attitude, roll speed, sideslip, roll signal and yaw signal, which are associated with the values of the gains of the amplifiers of the system.

In this way, in order to resume a constant heading, i.e. to resume a zero yaw speed, there is a choice between action on the control stick or action on the rudder pedal.

According to the invention, a device is provided, making it possible to resume the constant heading, maintaining a zero amplitude of the roll control surfaces.

To that end, the device for elaborating the single electrical order for roll control and the device for elaborating the electrical order for yaw control each comprise an additional amplifier, of which the output is connected to the corresponding summing device, the inputs of said additional amplifiers being connected in common to a device for correcting thrust dissymmetry. This thrust dissymetry correction device preferably comprises an integrator whose output supplies said additional amplifiers and of which the input may be connected, for a first position of a switch, to a zero voltage and, for a second position of said switch, to a constant reference voltage, this switch being controlled by a control device which causes it to take said second position for a representative triggering condition since the aircraft flies with constant heading, the pilot has released the first voluntary actuation member and the roll control surfaces are too deflected, said control device returning said switch to its first position, as soon as said first voluntary actuation member is stressed by the pilot or the deflection of the roll control surfaces is close to zero.

It is advantageous if said triggering condition includes in addition that the aircraft is stabilized in roll and that the effort exerted for the second voluntary actuation member is zero.

The sign of the reference voltage depends on the direction of deflection of the roll control surfaces.

Furthermore, as for the other amplifiers, the gains of said additional amplifiers of said devices for elaborating the electrical orders for roll control and for yaw control are controllable as a function of the flight configuration and of the speed of said aircraft.

The Figures of the accompanying drawing will clearly show how the invention may be carried out.

FIG. 4 schematically illustrates the adjustment of the device for distributing the single roll signal and the gains of the amplifiers of the devices for elaborating the electrical signals for roll and yaw control, as a function of the configuration and the speed of said aircraft.

Figure 7:
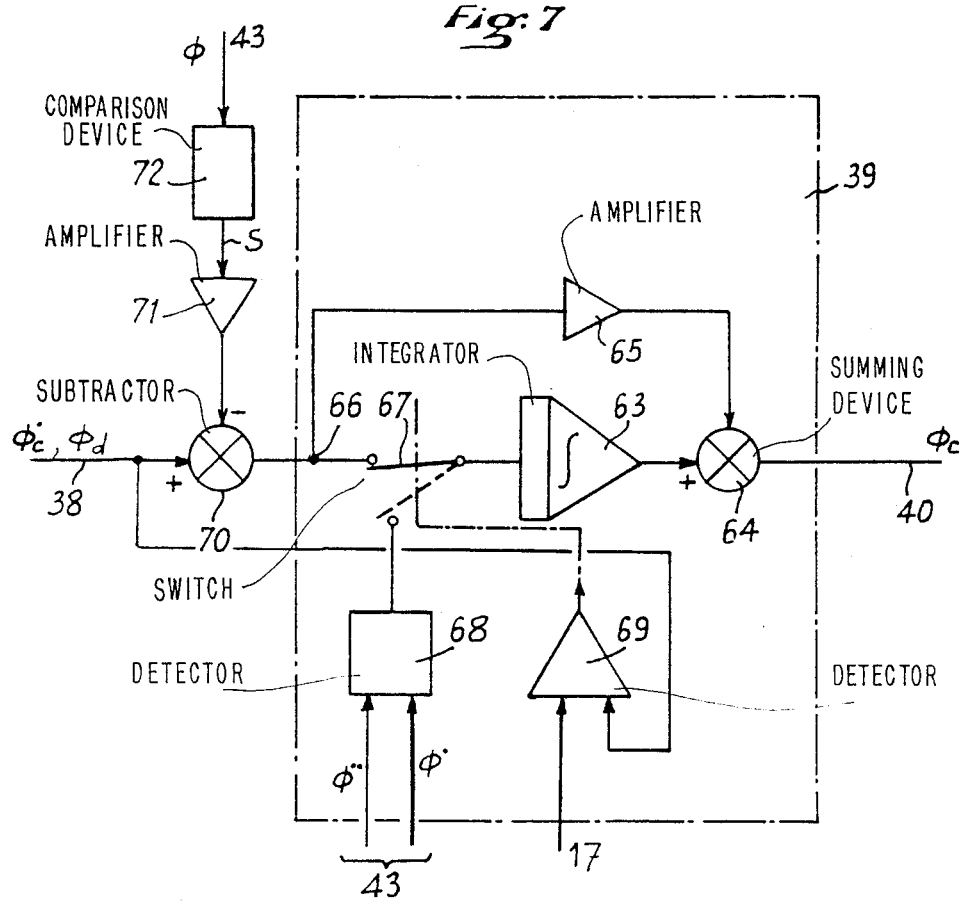

FIGS. 5 to 7 show three variant embodiments of the generator of reference values for the roll attitude of the aircraft.

Figure 8:
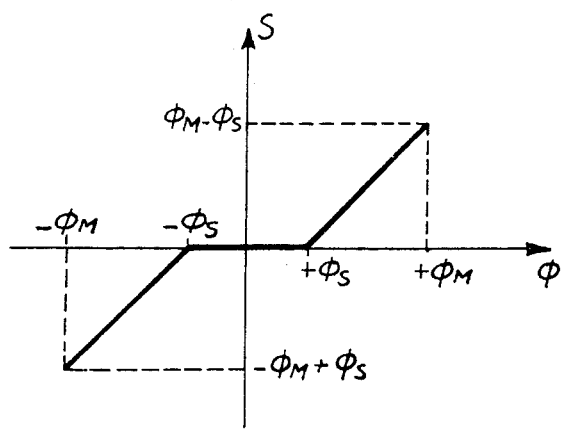

FIG. 8 is a diagram illustrating the operation of the generator of FIG. 7.

FIG. 9 illustrates a fourth variant embodiment of the generator of reference values for the roll attitude of the aircraft.

FIG. 10 shows the block diagram of the device making it possible to maintain a constant heading in the event of thrust dissymetry.

In these Figures, identical references designate like elements.

Figure 1:
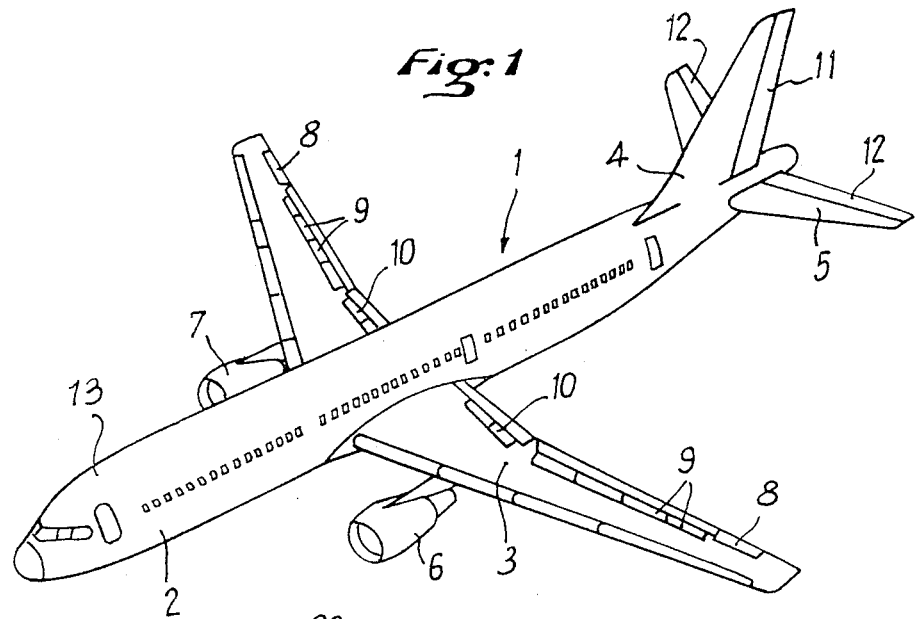
FIG. 1 shows, in perspective from above, a jumbo jet civil aircraft applying the system of roll and yaw control according to the invention.

The jumbo jet civil aircraft 1, shown in perspective in FIG. 1, comprises a fuselage 2, wings 3, a vertical stabilizer 4 and a horizontal stabilizer 5. It is propelled by two engines 6 and 7, fastened beneath wings 3.

On the upper surface of the wings 3 are provided trailing edge ailerons 8, spoiler flaps 9, also called spoilers, and airbrakes 10. On the vertical stabilizer 4 is provided a rudder 11, whilst elevators 12 are articulated on the trailing edge of the horizontal stabilizer 5.

In known manner, roll control of the aircraft 1 may be obtained thanks to actuation of the ailerons 8 and/or the spoiler flaps 9, whilst yaw control of said aircraft is effected by means of the rudder 11. To that end, in the pilot's cabin 13 of said aircraft 1 are provided at least one control stick 14 and at least one rudder pedal 15, at the pilot's disposal (cf. FIG. 2). The control stick 14 controls rotation of the ailerons 8 and the spoiler flaps 9 about their axis of rotation X-X, whilst the rudder pedal 15 controls rotation of the rudder 11 about its axis of rotation Y-Y. For simplification purposes, only one roll control surface, which may be an aileron 8 or a spoiler flap 9, is shown in FIG. 2.

The present invention concerns only the control of the ailerons 8, the spoiler flaps 9 and the rudder 11, with the result that the controls of the airbrakes 10, the elevators 12 and possibly of the horizontal stabilizer 5 will not be described.

Figure 2:
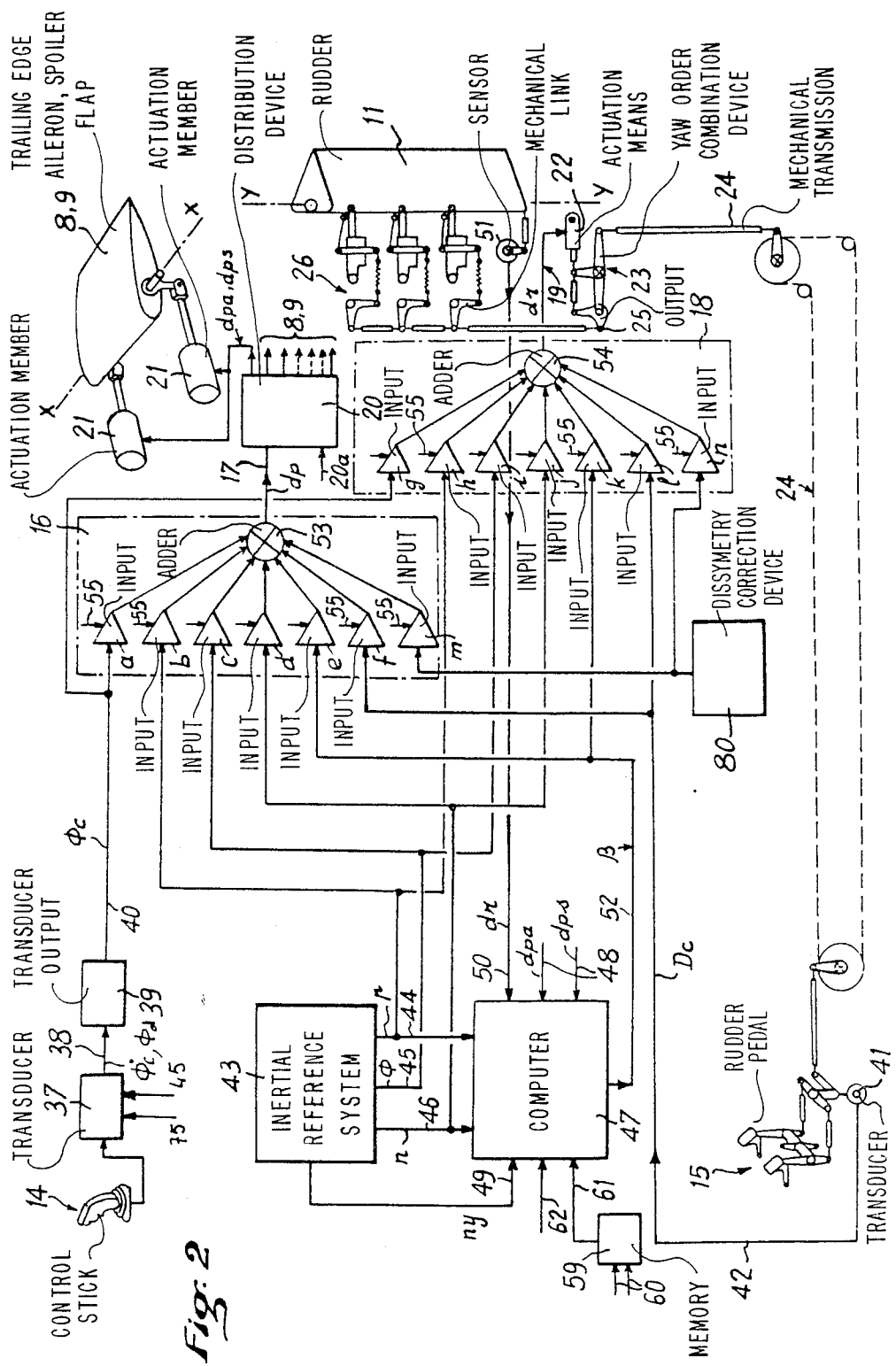
FIG. 2 shows the block diagram of the system of roll and yaw control, according to the invention.

As shown in FIG. 2, the control system according to the invention comprises a device 16 for elaborating a single electrical order for roll control appearing at the output 17 of said device 16 and a device 18 for elaborating an electrical order for yaw control appearing at the output 19 of said device 18.

The single roll order available at the output 17 of the device 16 is applied to a distribution device 20 which controls the actuation members 21 (for example jacks) of each aileron 8 and/or of each spoiler flap 9 so that the aircraft 1 takes the desired roll attitude. The distribution device 20 is programmed so that, as a function of the value of the roll signal present at the output 17 and as a function of the information concerning the speed of the aircraft and the flight phase underway (cruise flight, take-off, landing, etc...) that it receives at its input 20a, said desired roll attitude is obtained either by control of the ailerons 8 alone, or by that of the spoiler flaps 9 alone, or by a combined control of said ailerons 8 and said spoiler flaps 9.

The electrical yaw order available at the output 19 of the device 18 is applied to actuation means 22 (for example jacks) of rudder 11, which themselves act on a device 23 for combination of yaw order. This device 23 for combination of yaw order is furthermore connected to the rudder pedal 15, via a mechanical transmission 24. In this way, device 23 is capable of receiving a control order by the actuation means 22 and/or a control order directly by the rudder pedal 15. It elaborates at its output 25, as explained hereinafter, a resultant order for yaw control which controls the rudder 11, via a mechanical link 26.

Figure 3A:
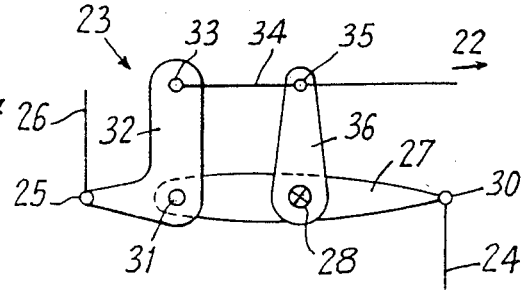
FIGS. 3a, 3b and 3c illustrate the structure and operation of the device intended to combine the electrical order and the mechanical order for yaw control.
Figure 3B:
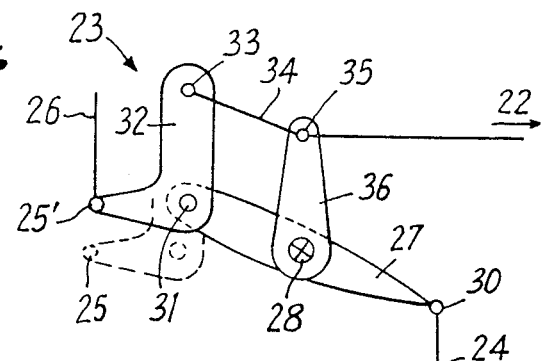
Figure 3C:
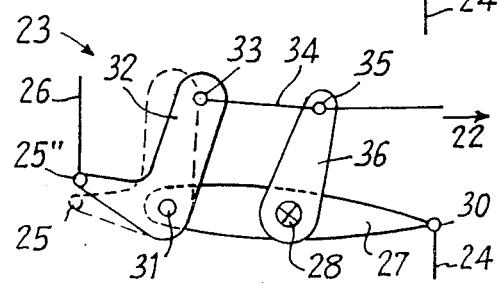

As may be schematically seen in FIGS. 3a, 3b and 3c, the yaw order combination device 23 comprises a lever 27 articulated in its median part about a fixed pin 28 fast with the structure of the aircraft 1 and articulated at one of its ends at 30, on a mechanical transmission 24, connected to the rudder pedal 15. At its opposite end, the lever 27 is articulated, at 31, on the apex of an angle 32 of which one branch constitutes the output 25, articulated on the mechanical link 26. The other branch of the angle 32 is articulated, at 33, at its end opposite articulation 31, on a connecting rod 34. The other end of the connecting rod 34 is articulated at 35, on one end of a lever 36 of which the other end is articulated about the fixed pin 28. The articulation 35 is connected to the actuation means 22. The articulations and pin 28, 31, 33 and 35 determine a deformable parallelogram.

FIG. 3a shows the device 23 at rest, i.e. in neutral position, when no deflection order is addressed to the rudder 11, either by the device 18 or by the pedal 15. If the pedal is actuated by the pilot, whereas no order is addressed by the device 18 (cf. FIG. 3b), the lever 27 pivots about pin 28 and the output 25 passes to position 25′. Consequently, the rudder 11 is controlled in rotation about its axis Y-Y. Inversely, if the actuation means 22 receive an order from device 18, whereas the pedal 15 is in neutral position (cf. FIG. 3c), the lever 27 remains in the position of FIG. 3a, but the angle 32 pivots about articulation 31. The output 25 of device 23 then passes to position 25″. It is easily seen that, if the device 23 receives simultaneously an order from the pedal 15 and an order from device 18, it combines the two orders to control the rudder 11.

The control stick 14 is connected to a transducer 37, delivering at its output 38 an electric signal depending on the tipping of said control stick 14 and representative of a required roll speed $\phi c$. This signal $\phi c$ is applied to a device 39, of the integrator type, therefore delivering at its output 40 a controlled roll attitude value or reference value $\phi c$.

Furthermore, the rudder pedal 15 is connected to a transducer 41, delivering at its output 42 an electric signal dependent on its position and representative of a controlled direction Dc.

In aircraft 1 there is provided an inertial reference system 43, generally designated by IRS, capable of delivering, respectively on outputs 44, 45 and 46, the rolling speed p (also called roll rate), the real roll attitude $\phi$ and the yaw speed r (also called yaw rate). This information of rolling speed p and of yaw speed r coming from the inertial reference system 43 is addressed to a computer 47. The computer 47 further receives, on inputs 48, the values dpa and dps of the deflection of ailerons 8 and of spoiler flaps 9 either directly from the distribution device 20 or from sensors (not shown) mounted thereon and, on an input 49, the lateral acceleration ny of said aircraft 1 delivered by the IRS system 43. Finally, on an input 50, the computer 47 receives, either from a sensor 51 connected to the rudder 11, or from the output 19 of the device 18, the value dr of deflection of the rudder. From the data r, p, dpa, dps, ny and dr, the computer 47 calculates, as will be seen hereinafter, an estimated value $\beta$ for the sideslip of aircraft 1, which it delivers on its output 52.

The device 16 for elaborating the single roll signal comprises six amplifiers, respectively bearing references a to f and of which the respective gains will be indicated hereinafter by Ka to Kf.

The inputs of amplifiers a to f are respectively connected to the output 40 of the integrator device 39, to inputs 44, 45 and 46 of the system 43, to output 52 of the computer 47 and to output 42 of the transducer 41. The outputs of these amplifiers are connected to an adder 53, of which the output forms the output 17 of the device 16. Consequently, at the output 17 appears a roll (or roll control) order dp, such that $$dp = Ka.\phi c + Kb.p + Kc.\phi + Kd.r + Ke.\beta + Kf.Dc \qquad (1)$$

Similarly, the device 18 for elaborating the electric yaw signal comprises six amplifiers, respectively bearing references g to l and of which the respective gains will be designated by Kg to Kf.

The inputs of amplifiers g to l are respectively connected to the output 40 of the integrator device 39, to the outputs 44, 45, and 46 of the system 43, to the output 52 of the computer 47 and to the output 42 of the transducer 41. The outputs of these amplifiers are connected to an adder 54 of which the output forms the output 19 of the device 18. Consequently, at the output 19 there appears an order of direction (or of yaw) dr, such that $$dr = Kg.\phi c + Kh.p + Ki.\phi + Kj.r + Kk.\beta + Kl.Dc \qquad (2)$$

Each amplifier a to l is of the variable gain type and comprises a gain control input 55.

As may be seen in FIG. 4, the inputs 55 of said amplifiers, as well as the input 20a of the distribution device 20 receive orders from a control device 56, which itself receives information from a configuration computer 57 and from means 58 for measuring the speed of the aircraft 1. In this way, the values of the gains Ka to Kl of the amplifiers a to l and those of the deflections dpa and dps of the ailerons 8 and of the spoiler flaps 9 may be adjusted as best possible as a function of the flight configuration and of the speed of the aircraft.

As has been stated hereinabove, at each instant, the value of the sideslip $\beta$ is calculated by computer 47. To that end, the latter may employ the relation (3) hereinbelow connecting the lateral acceleration ny (also called "lateral load factor") and the lateral aerodynamic forces. In fact, the following may be written:

$$ny = -V/g(Cyp.p + Cyr.r + Cy\beta.\beta + Cydr.dr + Cypa.dpa + Cyps.dps) \qquad (3)$$

expression in which, ny, p, r, $\beta$, dr, dpa and dps having the significance mentioned hereinabove, the other parameters respectively represent:

V: linear speed of the aircraft;

g: acceleration of gravity:

Cyp: aerodynamic coefficient, such that Cyp.p represents the contribution of the rolling speed p to the sum of the lateral forces applied to the aircraft 1;

Cyr: aerodynamic coefficient, such that Cyr.r represents the contribution of the yaw speed r to the sum of the lateral forces applied to the aircraft 1;

Cy$\beta$: aerodynamic coefficient, such that Cy$\beta$.$\beta$ represents the contribution of the sideslip $\beta$ to the sum of the lateral forces applied to the aircraft 1;

Cydr: aerodynamic coefficient, such that Cydr.dr represents the contribution of the deflection of the rudder 11 to the sum of the lateral forces applied to the aircraft 1;

Cypa: aerodynamic coefficient, such that Cypa.dpa represents the contribution of the deflection of the ailerons 8 to the sum of the lateral forces applied to the aircraft 1; and Cyps: aerodynamic coefficient, such that Cyps.dps represents the contribution of the deflection of the spoiler flaps 9 to the sum of the lateral forces applied to the aircraft 1.

The different aerodynamic coefficients hereinabove depend on the dynamic pressure and on the mass of the aircraft 1. Moreover, they vary with the incidence thereof. For example, they are stored in the form of tables in a memory 59, which receives the incidence and the dynamic pressure on inputs 60. This incidence and this dynamic pressure come for example from sensors (not shown). In this way, at its output 61, the memory 59 may deliver the present values of said aerodynamic coefficients, which are transmitted to the computer 47. Moreover, via a link 62, the computer 47 receives the speed V of the aircraft, delivered by the measuring means 58.

Thus, knowing furthermore g, the computer 47 may calculate the value of the sideslip $\beta$, by the expression:

$$\beta = -\frac{1}{Cy\beta}\left(\frac{g}{V}ny + Cyp \cdot p + Cyr \cdot r + Cydr \cdot dr + Cypa \cdot dpa + Cyps \cdot dps\right) \qquad (4)$$

directly derived from the relation (3).

In the system of FIG. 2, is chosen:

the gain Kf of the amplifier f of the device 16, i.e. the magnitude of the action of the rudder pedal 15 on the roll control, so as to counter the roll induced by the rudder 11 and therefore so as to maintain a low roll attitude $\phi$ during placing in sideslip without any action on the control stick 14;

the gain Kl of the amplifier l of the device 18, i.e. the magnitude of the action of the rudder pedal 15 on the rudder 11, so that the maximum deflection of said rudder corresponds to the total stroke of the rudder pedal 15;

the gains Kg, Kh, Ki and Kj of the amplifiers g, h, i and j of device 18, i.e. the magnitude of the roll control reference $\phi c$ and the magnitude of the parameters of reaction p, $\phi$ and r on the direction, so as permanently to cancel the sideslip induced by a control of the rudder 11 with the aid of the rudder pedal 15;

the gains Kb, Kc, Kd, Ke of the amplifiers b, c, d and e of the device 16 and the gains Kh, Ki, Kj, Kk of the amplifiers h, i, j and k of the device 18, i.e. the magnitude of the action of the parameters of reaction p, $\phi$, r and of the sideslip $\beta$ on the roll and the yaw, so as well to dampen the Dutch roll and so that well determined time constants result therefrom, compatible with the controllability of the aircraft 1.

Moreover, it will be noted that the gain Ka of the amplifier a of the device 16 not only determines the magnitude of the reference $\phi c$ on the roll control, but also makes it possible to adjust the static gain of the parameter of reaction $\phi$.

FIG. 5 shows a first embodiment of the integrator device 39 delivering the controlled roll attitude value $\phi c$. In this embodiment, between the input 38, on which appears a roll speed value $\dot\phi c$ demanded by the actuation of the control stick 14, and the output 40, on which is available a controlled roll attitude value $\phi c$, there is disposed an integrator 63 and a summing device 64. Moreover, in parallel on said integrator 63, there is mounted an amplifier 65 whose input has a common point 66 with that of said integrator 63 and is therefore connected to the input 38 and whose output is connected to the summing device 64. In this way, at the output 40, there appears the sum of the signals delivered by the integrator 63 and by the amplifier 65, the latter bringing a phase advance gain. As explained hereinabove, the integrator device 38 illustrated in FIG. 5 allows an aircraft neutral in roll to be obtained.

However, such an embodiment may prove to be insufficient if certain roll control surfaces 8, 9 fail. In that case, in fact, the reference $\phi c$ demanded by the pilot via the control stick 14 may, particularly at low speed, exceed the possibilities of the aircraft 1. The flight controls then saturate the roll control surfaces, but without attaining the equality of $\phi$ with $\phi c$. The reference $\phi c$ will therefore vary more rapidly than the real attitude $\phi$ and, if this situation is prolonged for some instants, the difference $\phi c - \phi$ may become very great. Thus, when the pilot considers that he has attained a satisfactory attitude value and consequently releases the control stick 14, this difference $\phi c - \phi$ has for its effect that the aircraft 1, instead of remaining at an attitude close to that attained when the stick 14 was released (as explained hereinabove), tends to continue the obtaining of a very different value $\phi c$. This may result in considerable disturbances in piloting.

The embodiment of FIG. 6 attempts to overcome this drawback. In this embodiment, there is disposed between the input of the integrator 63 and the common point 66, a controlled two-position switch 67. For the first of these positions, the switch 67 connects point 66 to the input of the integrator 63. For the second of said positions, the input of the integrator 63 is connected to a device 68 which receives from the inertial reference system 43, the first derivative $\dot\phi$ and the second derivative $\ddot\phi$ of the real attitude $\phi$ and which delivers a signal of form $\dot\phi + k\ddot\phi$. The switch 67 is controlled by a detector 69 which detects the saturation of dp (output 17) during non-zero deflection of the control stick. As long as the detector 69 does not detect saturation of dp or deflection of the control stick, the switch 67 remains in its first position and operation of the device 39 of FIG. 6 is identical to that of the device 39 of FIG. 5. On the other hand, as soon as the detector 69 detects a saturation of the roll control surfaces, it causes the switch 67 to tip into its second position, with the result that the integrator 63 receives the signal $\dot\phi + k\ddot\phi$. The roll reference then no longer varies at speed $\phi c$, but at the maximum speed $\dot\phi$ that the aircraft 1 may furnish at that moment, increased by the phase advance term $k\ddot\phi$.

Moreover, it may be advantageous if the neutrality of the aircraft in roll (mentioned hereinabove) is effective only for a roll attitude $\phi$ less than a threshold $\phi s$, for example of the order of 30°, but that, on the other hand, said aircraft is stable in roll beyond said threshold $\phi s$, which means that, in that case, if the control stick 14 is released, the real attitude $\phi$ returns to the value $\phi s$. It may also be advantageous if, beyond the threshold $\phi s$, the real roll attitude $\phi$ is a function of the position of the control stick 14. In fact, in that case a limitation of this real roll attitude $\phi$ is obtained, since in that case a roll attitude which cannot be exceeded corresponds to the full travel of the control stick 14. An embodiment of the integrator device 39, capable of procuring such results, is shown in FIG. 7.

In this embodiment of FIG. 7, is found the arrangement of the elements 63 to 69 of FIG. 6. Moreover, between the output 38 of the transducer 37 and the common point 66, there is disposed a subtractor 70 which receives the signal $\phi c$ from output 38, and the output signal of an amplifier 71. The input of the amplifier 71 is connected to the output of a comparison device 72 which receives, from the IRS system 43, the value of the real roll attitude $\phi$.

The comparison device 72 delivers at its output a signal S, such that:

(a) S=0, if the absolute value of $\phi$ is less than the absolute value of threshold $\phi s$;
(b) S=$\phi - \phi s$, if $\phi$ is greater than $+\phi s$;
(c) S=$-\phi + \phi s$, if $\phi$ is less than $-\phi s$.

The variation of the signal S as a function of $\phi$ is shown in FIG. 8, in which $\phi M$ designates the maximum value that $\phi$ may take.

Furthermore, it is provided that, when the real roll attitude $\phi$ is less than $-\phi s$ or greater than $+\phi s$, the transducer 37 no longer delivers a roll speed reference $\dot\phi c$, but a desired attitude $\phi d$. To that end, the transducer 37 receives the magnitude $\phi$ appearing at the output 45 of the inertial reference system 43.

In this way, when the real attitude $\phi$ is included between $-\phi s$ and $+\phi s$, the operation of the device of FIG. 7 is identical to that of FIG. 6.

On the other hand, when $\phi$ is greater than $+\phi s$ or less than $-\phi s$ and the switch 67 is in the position shown in solid lines, the integrator 63 receives the difference $\phi d - K.S$, if K is the gain of the amplifier 71. This difference varies as a function of time. Consequently, the attitude reference $\phi c$ is then the result of the integration of $\phi d - K.S$ by the integrator 63.

In permanent regime, the signal at the input of the integrator 63 is zero, with the result that one has, at that moment:

$$\phi d - K.S = 0$$

Consequently, if:
$\phi$ is greater than $+\phi s$, one has $$\phi d - K.(\phi - \phi s) = 0$$

or $\phi = \phi s + \phi d/k$ $\phi$ is less than $-\phi s$, one has:

$$\phi d - K(-\phi + \phi s) = 0$$

or $\phi = \phi s - \phi d/k$.

Consequently, if the pilot releases the control stick 14, $\phi d$ becomes equal to 0 and the aircraft spontaneously resumes an attitude $\phi$ equal to $\phi s$.

Moreover, it is seen that, if $\phi dM$ designates the maximum value of the desired attitude $\phi d$ delivered by the transducer 37 when the displacement of the control stick 14 is maximum, the maximum value $\phi M$ taken by the attitude $\phi$ of the aircraft 1 is equal, depending on the sign of $\phi$, either to $\phi s + \phi dM/K$, or to $\phi s - \phi dM/K$.

FIG. 9 shows a device similar to that of FIG. 7, but completed in order to be able automatically to take into account a speed limit below which one is sure that the aircraft 1 will not be subjected to any wobble. Such a speed limit is generally called "speed protection".

To that end, in parallel on the amplifier 71 and on the signal generator 72, there are mounted an amplifier 73 and a time constant device 74. The output of the amplifier 73 is connected to the subtraction input of the subtractor 70, whilst a control device 75 is provided to address the attitude $\phi$ coming from the IRS system 43, either to the input of the generator 72, or to that of the time constant device 74. To that end, a switch 76 is provided, controlled by device 75. This latter receives the real speed Vc of the aircraft 1 delivered by device 58 and compares it with the value VMO of the maximum operational speed, determined by the constructor of the aircraft 1. If Vc is less than VMO, the switch 76 addresses the information $\phi$ to the generator 72 (position shown in FIG. 9) and, in that case, the device operates in manner identical to that described hereinabove with reference to FIG. 7. On the other hand, if Vc is greater than VMO, the device 7, on the one hand, causes the switch 76 to tip, with the result that the time constant device 74 then receives the attitude $\phi$, and, on the other hand, controls the transducer 37 so that the latter delivers a required attitude value $\phi d$ and no longer a rolling speed value $\phi c$. Consequently, the signal at the input of the integrator 39 is then equal, if K1 is the gain of the amplifier 73, to the difference $\phi d - K1.\phi$, variable in time.

In permanent regime, one has $\phi d - K1.\phi = 0$, with the result that $\phi = \phi d / K1$.

Consequently, after exceeding the maximum operational speed, if the control stick 14 is released (i.e. if $\phi d = 0$), the attitude of the aircraft 1 becomes zero, i.e. the aircraft is automatically returned to a configuration with flat wings. The time constant device 74 has for its object to avoid any brutality in this automatic return to zero attitude.

Furthermore, as mentioned hereinabove, the system according to the invention has for its object, in the event of an engine failure in particular, to correct the dissymetry of thrust in order to allow the aircraft 1 to fly with constant heading ($r = 0$) without deflection of the roll control surfaces ($dp = 0$).

To that end, a thrust dissymetry correction device 80 is provided (cf. FIGS. 2 and 10), which addresses the same output signal to two amplifiers m and n, respectively, provided in device 16 and in device 18. As for the amplifiers a to f, the output of the amplifier m is connected to the summing device 53 and the gain Km of said amplifier m is controllable by an input 55 as a function of the flight configuration and of the speed of the aircraft 1. Similarly, as for the amplifiers g and l, the output of the amplifier n is connected to the summing device 54 and the gain Kn of said amplifier n is controllable by an input 55 as a function of the flight configuration and of the speed of the aircraft 1.

As may be seen in FIG. 10, the device 80 comprises a generator 81 of constant reference voltage, of which the sign, positive or negative, is controlled by the sign of the signal dp appearing at the output 17 of the device 16, i.e. the sign of this reference voltage depends on the direction of deflection of the roll control surfaces (8, 9). This reference voltage, or a zero voltage, may be applied to the input of an integrator 82, via a switch 83. The output of the integrator 82 is connected to the amplifiers m and n and the switch 83 is controlled by a control device 84 which receives the signals representative of the rolling speed p, the yaw speed r, the roll control order dp, the position of the control stick 14 and of the position of the rudder pedal 15.

When the switch 83 is in its first position for which it connects the zero voltage to the integrator 82, the device 80 has no effect and the system of FIG. 2 behaves as described hereinabove.

The control device 84 causes the switch 83 to pass from this first position to the second, for which the generator 81 is connected to the integrator 82, when the following conditions are simultaneously complied with:

the aircraft 1 flies with constant heading. To verify whether this condition is fulfilled, the device 84 examines the yaw speed signal r, possibly filtered in order to eliminate disturbances thereof, and if the signal r remains less than a given threshold during a determined time (some seconds), it deduces that the heading of the aircraft 1 is constant.

the control stick 15 is not stressed ($\phi c = 0$), i.e. the aircraft 1 is not controlled in roll. The device 84 verifies that $\phi c = 0$.

the deflection of the roll control surfaces (8, 9) exceeds a given threshold. To that end, the device 84 examines the signal dp at the output 17, filters it and verifies whether, during a determined duration (some seconds), this signal dp is greater or not than a determined threshold.

To these three simultaneous conditions, the device 84 may advantageously add the following two, in order to refine control:

the aircraft 1 is stabilized in roll. The device 84 verifies whether the signal p remains less than a given threshold during a determined time (some seconds).

the effort at the rudder pedal is zero. The device 84 examines whether $Dc = 0$.

It is seen that the device 84 effects only operations of comparison, with the result that it may be made in logic form or in the form of software. In both cases, it presents a well known structure which does not need a detailed description.

When the switch 83 is in its second position, further to the combination of the preceding conditions, the integrator 82 integrates the constant reference voltage, with the result that a ramp signal appears at the inputs of the amplifiers m and n.

As a function of time, the signal delivered by amplifiers m and n, respectively, to summing devices 53 and 54 is therefore varied, thus covering all the possible combinations of flying with constant heading. As soon as $dp = 0$ is obtaied at the output 17, the device 4 causes the switch 83 to pass to its first position. The same applies as soon as the control stick 14 is stressed, i.e. as soon as $\phi c$ is no longer zero.

I claim:

1. System for controlling roll and yaw of an aircraft (1) comprising roll control surfaces (8, 9) actuated from a first voluntary actuation member (14) and a rudder (11) actuated from a second voluntary actuation member (15), via a mechanical transmission (24), said first and second voluntary actuation members (14, 15) being associated with transducers (37, 39–41) delivering respectively first and second electrical signals depending on the position of said members, said aircraft comprising in addition means (43, 47) capable of delivering third, fourth, fifth and sixth electrical signals respectively representative of the rolling speed, the attitude, the yaw speed and the sideslip of said aircraft, said system comprising:

(a) a device (16) capable of elaborating, from said first, third, fourth, fifth, sixth and second electrical signals respectively representative of the position of said first voluntary actuation member, the rolling speed, the attitude, the yaw speed, the sideslip and of the position of said second voluntary actuation member, a single electrical order for roll control formed by a linear combination of said first to sixth electrical signals;

(b) a distribution device (20) which, from said single electrical roll control order, controls each of said roll control surfaces via first actuation means (21);

(c) a device (18) capable of elaborating, from said first, third, fourth, fifth, sixth and second electrical signals respectively representative of the position of said first voluntary actuation members, the rolling speed, the attitude, the yaw speed, the sideslip and of the position of said second voluntary actuation member, an electrical order for yaw control formed by a linear combination of said first to sixth electrical signals; and (d) a device (23) for combining said electrical yaw control order and a mechanical order coming directly from said second voluntary actuation member (15) via said mechanical transmission (24), to delivery a single combined order of yaw control, which controls said rudder (11), via second actuation means (26).

2. System according to claim 1 wherein the device (16) for elaborating the single electrical order for roll control comprises a plurality of amplifiers (a to f) whose inputs receive respectively said first, third, fourth, fifth, sixth and second electrical signals representative of the position of said first voluntary actuation member (14), the rolling speed, the attitude, the yaw speed, the sideslip and of the position of said second voluntary actuation member (15), and whose outputs are connected in common to a summing device (53) delivering said single electrical order for roll control.

3. System according to claim 2 wherein said correction signal (s) is proportional to $\Phi - \Phi s$, if the attitude $\Phi$ is positive and greater than the positive value $+\Phi$ of said threshold, and to $-\Phi + \Phi s$, if the attitude $\Phi$ is negative and less than the negative value $-\Phi s$ of said threshold.

4. System according to claim 1 wherein the device (18) for elaborating the electrical order for yaw control comprises a plurality of amplifiers (g to l) whose inputs receive respectively said first, third, fourth, fifth, sixth and second signals representative of the position of said first voluntary actuation member (14), the rolling speed, the attitude, the yaw speed, the sideslip and of the position of said second voluntary actuation member (15), and whose outputs are connected in common to a summing device (54) delivering said electrical order for yaw control.

5. System according to either one of claims 2 or 4 wherein each of said amplifiers (a to f or g to l) is of the type with adjustable gain, said gain of said amplifiers being controlled as a function of the configuration and speed of the aircraft.

6. System according to claim 1 wherein said device (20) for distributing the single electrical order for roll control is a table which causes a value of deflection of each of said roll control surfaces (8, 9) to correspond to any value of said single electrical order.

7. System according to claim 1 wherein said device (23) delivering a single combined order for yaw control is constituted by an assembly of levers forming a deformable parallelogram of which one articulation (28) is fixed, said electrical order and said mechanical order for yaw control being respectively applied to the two sides (27, 36) of said articulated parallelogram about said fixed articulation, while the single combined order for yaw control is taken on one (32) of the other sides of said parallelogram.

8. System according to claim 1 further comprising means (47) for generating said sixth electrical signal representative of the sideslip from, on the one hand, said third and fifth electrical signals of rolling speed and of yaw speed and a lateral acceleration signal of said aircraft and, on the other hand, information on deflection of the rudder and the roll control surfaces.

9. System according to claim 1 further comprising a transducer (37) converting the tipping of said first voluntary actuation member (14) into a required rolling speed, as well as an integrator device (39) converting said required rolling speed into a reference value of attitude.

10. System according to claim 9 wherein said integrator device (39) comprises an integrator (63) and a phase advance amplifier (65) whose inputs have a common point (66) receiving said required rolling speed and whose outputs are connected to a summing device (64).

11. System according to claim 10 wherein, between said common point (66) and the input of said integrator (63), there is disposed a controlled switch (57) capable of connecting the input of said integrator (63) either to said common point (66) or to a generator (68) emitting a signal comprising the speed of variation of the real attitude, said switch (67) being controlled by the saturation of the roll control surfaces, when the control stick order is not zero.

12. System according to claim 11 wherein said generator (68) emits a signal which is a linear combination of the first derivative and of the second derivative of the roll attitude.

13. System according to any one of claims 9 to 12 wherein beyond an attitude threshold ($\Phi s$), the transducer (37) associated with said first voluntary actuation member (14) delivers a required attitude value ($\Phi d$), while, below said threshold, this transducer (37) delivers a required roll speed and, between the output of said transducer (37) and said integrator device (39), are provided first means (70, 71, 72) capable of subtracting from the signal issuing from said transducer (37) a correction signal (S) which is zero below said threshold ($\Phi s$), but which is a function of the attitude value really attained by the aircraft (1) beyond said threshold.

14. System according to any one of claim 9 to 12 wherein, beyond a speed threshold (VMO) of the aircraft (1), the transducer (37) associated with said first voluntary actuation member (14) delivers a required attitude value ($\Phi d$), while, below said speed threshold, this transducer (37) delivers a required roll speed and, between the output of said transducer (37) and said integrator device (39), are provided second means (70, 73, 74) capable of subtracting from the signal issuing from said transducer (37) a correction signal which is proportional to the real attitude of the aircraft.

15. System according to claim 14 wherein said first and second subtraction means are mounted in parallel and are rendered alternatively active in dependence on means (75, 76) comparing the speed of the aircraft with said speed threshold.

16. System according to claim 1 wherein device (16) for elaborating the single electrical order for roll control and the device (18) for elaborating the electrical order for yaw control each comprise an additional amplifier (m or n), of which the output is connected to the corresponding summing device (53 or 54), the inputs of said additional amplifiers (m and n) being connected in common to a device (80) for correcting thrust dissymmetry.

17. System according to claim 16 wherein the thrust dissymmetry correction device (80) comprises an integrator (82) whose output supplies said additional amplifiers (m and n) and of which the input may be connected, for a first position of a switch (83), to a zero voltage and, for a second position of said switch, to a constant reference voltage, this switch being controlled by a control device (84) which causes it to take said second position for a representative triggering condition since the aircraft flies with constant heading, the pilot has released the first voluntary actuation member and the roll control surfaces are too deflected, said control device (84) returning said switch (83) from its second to its first position, as soon as said first voluntary actuation member is stressed by the pilot and the deflection of the roll control surfaces is close to zero.

18. System according to claim 17 wherein said triggering condition moreover includes that the aircraft is stabilized in roll and that the effort exerted on the second voluntary actuation member is zero.

19. System according to claim 17 wherein the sign of the reference voltage depends on the direction of deflection of the roll control surfaces.

20. System according to claim 16 wherein the gains of said additional amplifiers (m and n) of said devices (16 and 18) for elaborating the electrical orders for roll control and for yaw control are controllable as a function of the flight configuration and of the speed of said aircraft.

* * * * *